(12) United States Patent
VanValkenburgh

(10) Patent No.: US 9,539,929 B2
(45) Date of Patent: Jan. 10, 2017

(54) QUICK RELEASE ANCHOR MECHANISM

(71) Applicant: Pit Bull Products, Inc., Huntsville, AL (US)

(72) Inventor: Charles VanValkenburgh, Huntsville, AL (US)

(73) Assignee: Pit Bull Products, Inc. AL (US)

( * ) Notice: Subject to any disclaimer, the term of this patent is extended or adjusted under 35 U.S.C. 154(b) by 0 days.

(21) Appl. No.: 14/732,892

(22) Filed: Jun. 8, 2015

(65) Prior Publication Data
US 2016/0355118 A1     Dec. 8, 2016

(51) Int. Cl.
*B60P 7/08*     (2006.01)
(52) U.S. Cl.
CPC ................... *B60P 7/0807* (2013.01)
(58) Field of Classification Search
CPC .................................................. B60P 7/0807
USPC ....... 410/101, 102, 106, 110, 116; 24/115 K, 24/265 CD; 248/499
See application file for complete search history.

(56) References Cited

U.S. PATENT DOCUMENTS

| 6,213,696 B1 * | 4/2001 | Austin | B60P 7/0807 410/101 |
| 7,134,819 B2 * | 11/2006 | Bullock | B60P 7/0807 410/102 |
| 7,686,551 B2 | 3/2010 | Grasso | |
| 8,414,237 B2 | 4/2013 | Grasso | |

OTHER PUBLICATIONS

Motorcycle Kryptonite Stronghold W/Anchor; webpage from www.motosport.com, May 2015.
ANCRA Removable Tie Down Anchor; webpage from www.motosport.com, May 2015.
Abus Granit WBA 100 ANchor; webpage from www.motosport.com, May 2015.

* cited by examiner

*Primary Examiner* — Stephen Gordon
(74) *Attorney, Agent, or Firm* — Adam K. Sacharoff; Much Shelist

(57) ABSTRACT

A quick release anchor mechanism for tying objects to a surface. The anchor mechanism includes a bottom plate secured to a surface by a pair of riser bolts. A mounting platform defined to include a base plate with keyhole slots to fit into the riser bolts, a body extending from the base plate to a loop for attaching objects thereto, and a nape extending from the body. The nape having a spring loaded pin system that is configured to releaseably connect the mounting platform to the bottom plate.

9 Claims, 9 Drawing Sheets

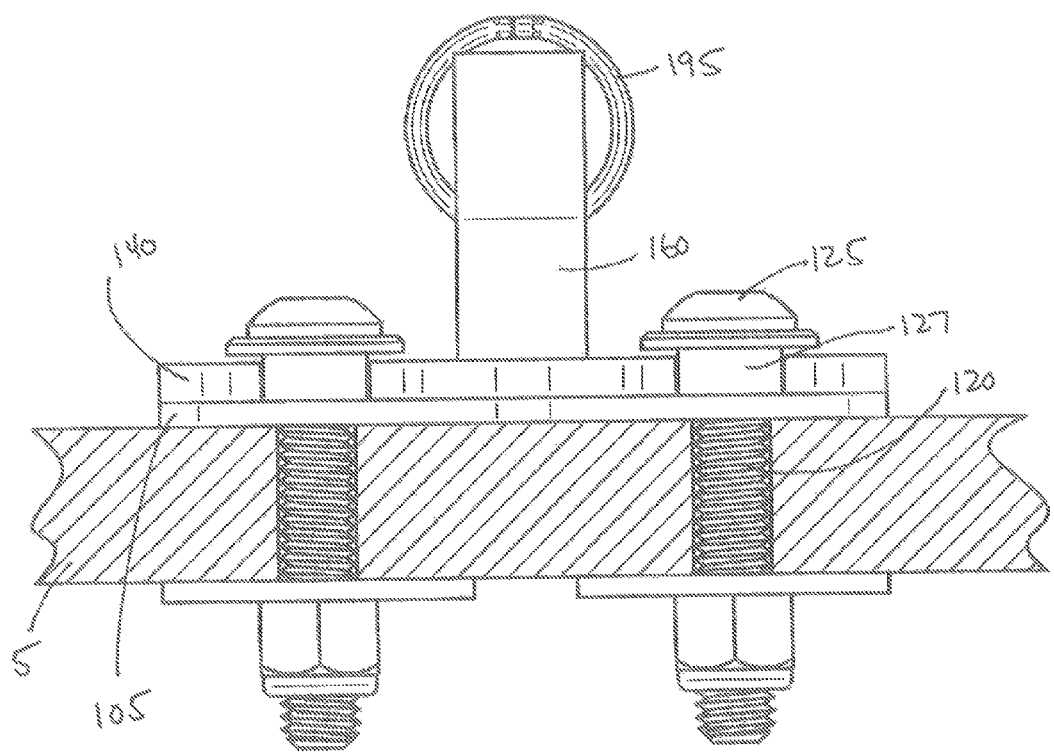

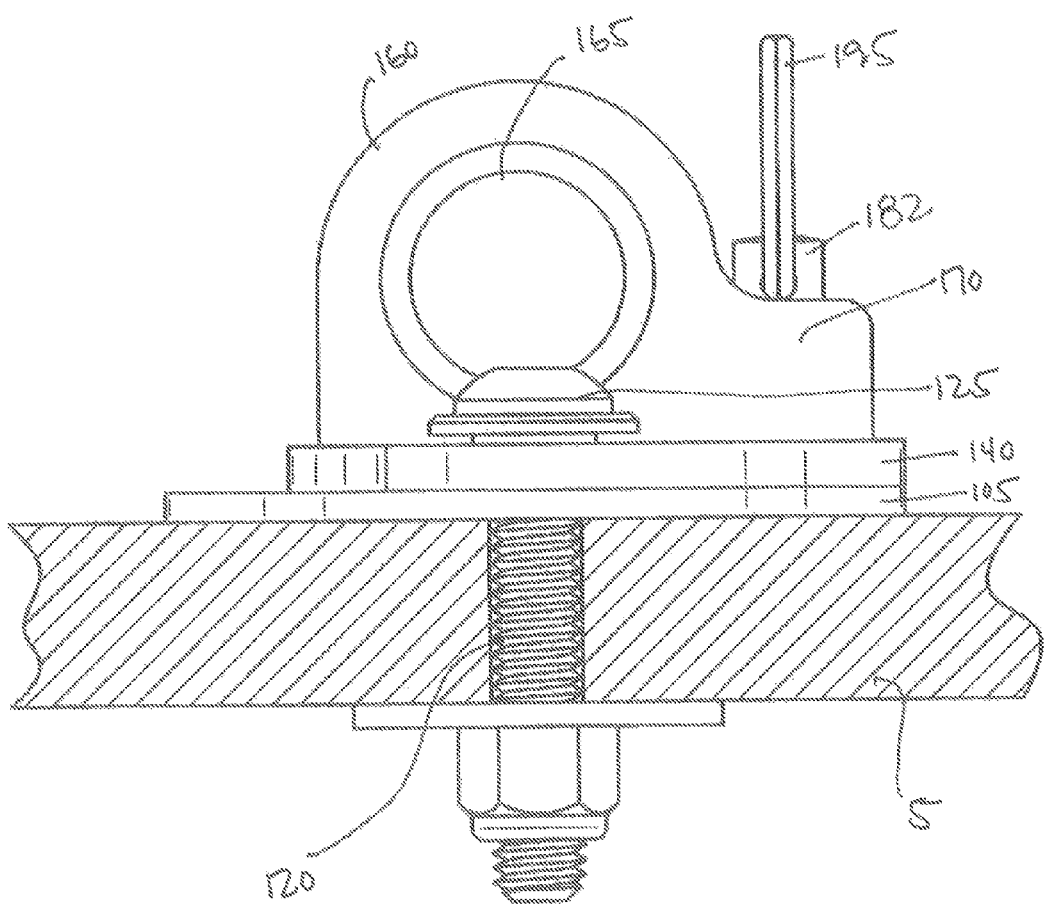

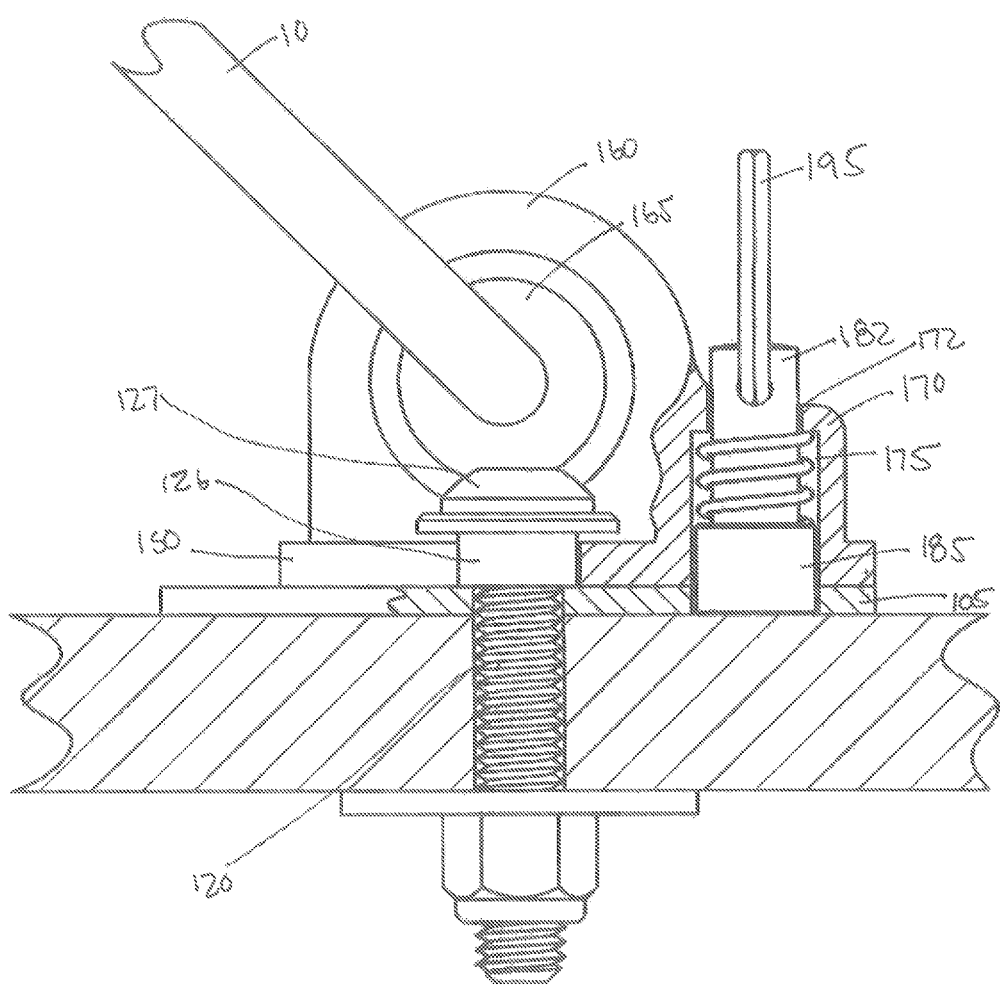

QUICK RELEASE ANCHOR MECHANISM

BACKGROUND OF THE INVENTION

The present invention relates generally to anchor mechanism used to tie items in place to help avoid the items being damaged when moved or tied down.

More particularly, this invention pertains to a quick release anchor mechanism that can be secured to a surface and that can be used with a latch to tie an item in place. When used as a pair positioned on either side of the item, such as a motorcycle, the quick release anchor mechanism is configured to secure the item in place. This particularly works well when the item is being transported in a trailer, truck or any other place cargo needs to be restrained.

Prior art tie downs exist but do not provide for the versatility provided in the present invention. Other tie downs require a portion of the surface to be cut or carved out for the proper fitting of the tie down base. Yet additional tie down anchor systems do not employ a keyhole slot and a spring-loaded locking pin in combination to provide a versatile product, meaning the prior art anchor system once installed cannot be easily moved to another location in the same manner.

BRIEF SUMMARY OF THE INVENTION

The present invention is a directed in one embodiment a quick release anchor mechanism for tying objects to a surface. The anchor mechanism includes a bottom plate secured to a surface. The bottom plate has a pair of bolt holes positioned at diametrically opposed sides of the bottom plate, and further has at least one pin opening. A pair of riser bolts are positioned through the pair of bolt holes to secure the bottom plate to the surface. Each riser bolt has a head section expanding from a neck portion that extends from a shaft of the riser bolt. The neck portion has a larger neck diameter than a diameter of the bolt hole, such that the neck portion and head section are positioned above the bottom plate by a distance defined by the length of the neck portion. A mounting platform is also included and is defined to include a base plate, a body extending from the base plate, and a nape extending from the body. The base plate includes a pair of keyhole slots grooved into one end of the base plate. The keyhole slots are spaced by a predefined distance to align with the neck portions of the bolts such that when attached the head section of each of the bolts is configured to position on top of the base plate. The body includes a mounting loop for receiving a means for tying an object to the mounting platform. The nape includes a bore that extends through the nape and to an opening the base plate. The anchor mechanism further includes a spring loaded pin system having a pin sized to slide through the bore of the nape. The pin has a pin shaft extending from a pin base section. The pin base section has a larger diameter than the pin shaft, and the pin shaft includes a side aperture. The spring loaded pin system further includes a ring positioned through the side aperture of the pin shaft and positioned over the bore, the spring loaded pin system further has a spring positioned around the pin shaft within the bore and configured to extend the pin base section out of opening in the base plate. The mounting platform is locked to the bottom plate by sliding the keyhole slots against the riser bolts and having the pin base section fitted into the at least one pin opening.

The quick release anchor mechanism may further include two pin openings. The pin openings would be separately positioned on either ends of the bottom plate between bolt holes on, such that the orientation of the mounting platform can be changed by removing the mounting platform from one pin opening and setting the mounting platform into the other pin opening.

In another aspect of the embodiment, the quick release anchor mechanism may include a collar that slides over the shaft. In yet other aspects of the embodiment, the quick release anchor mechanism is defined to allow for the ring to be pulled away from the nape, causing the spring to compress and the pin base to slide into the bore of the nape permitting the mounting mechanism to be removed from the bottom plate.

BRIEF DESCRIPTION OF THE DRAWINGS

A fuller understanding of the foregoing may be had by reference to the accompanying drawings, wherein:

FIG. 7 is a cross section view quick release anchor mechanism in accordance with an embodiment of the present invention;

FIG. 8 is a cross section view quick release anchor mechanism in accordance with an embodiment of the present invention; and FIG. 9 is a cross section view quick release anchor mechanism in accordance with an embodiment of the present invention.

DETAILED DESCRIPTION OF THE INVENTION

The present invention is new device for anchoring an object in a trailer, truck or other cargo hold to a surface and have the ability to quickly release the anchoring mechanism from its base such that it can be reoriented or moved.

Figure 1:
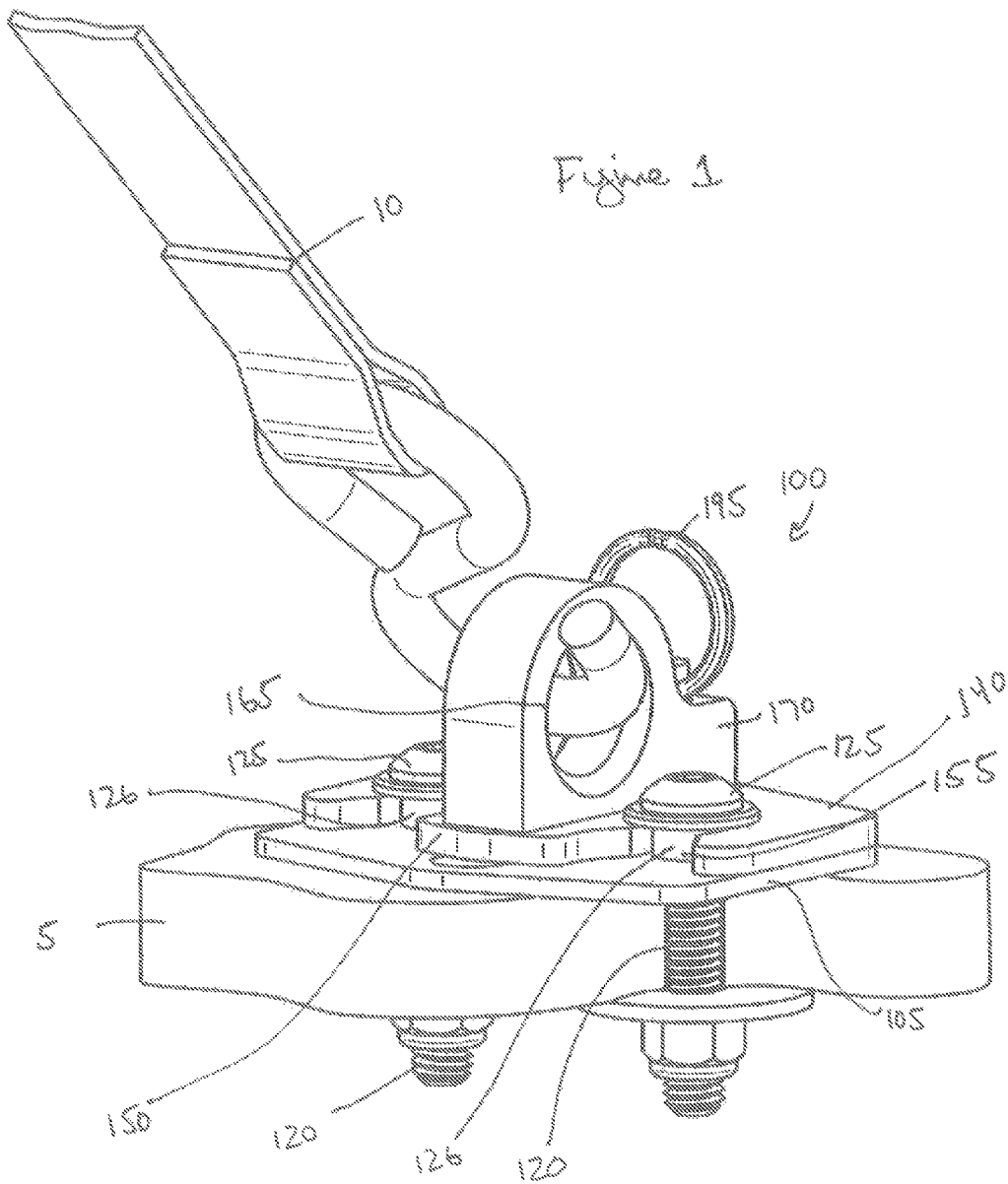
FIG. 1 is a perspective view of the quick release anchor mechanism in accordance with an embodiment of the present invention, being illustrated with a latch connected thereto.
Figure 2:
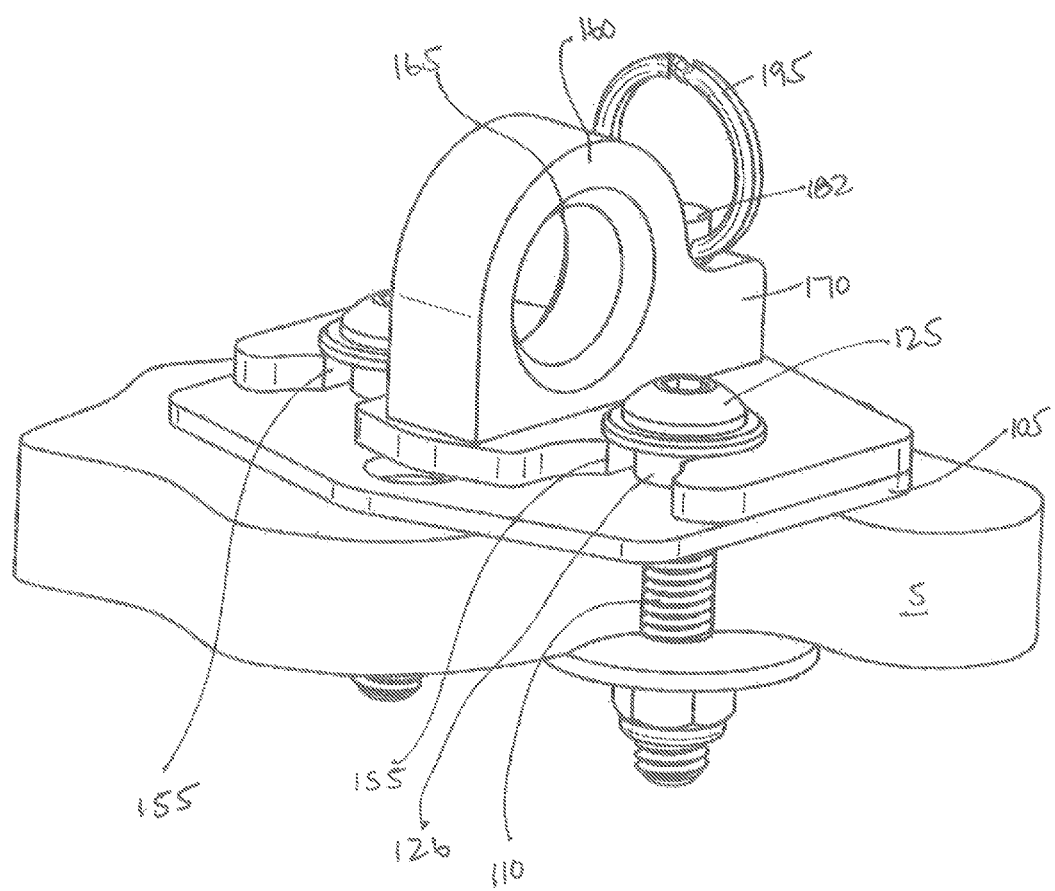
FIG. 2 is a perspective view of the quick release anchor mechanism in accordance with an embodiment of the present invention.
Figure 3:
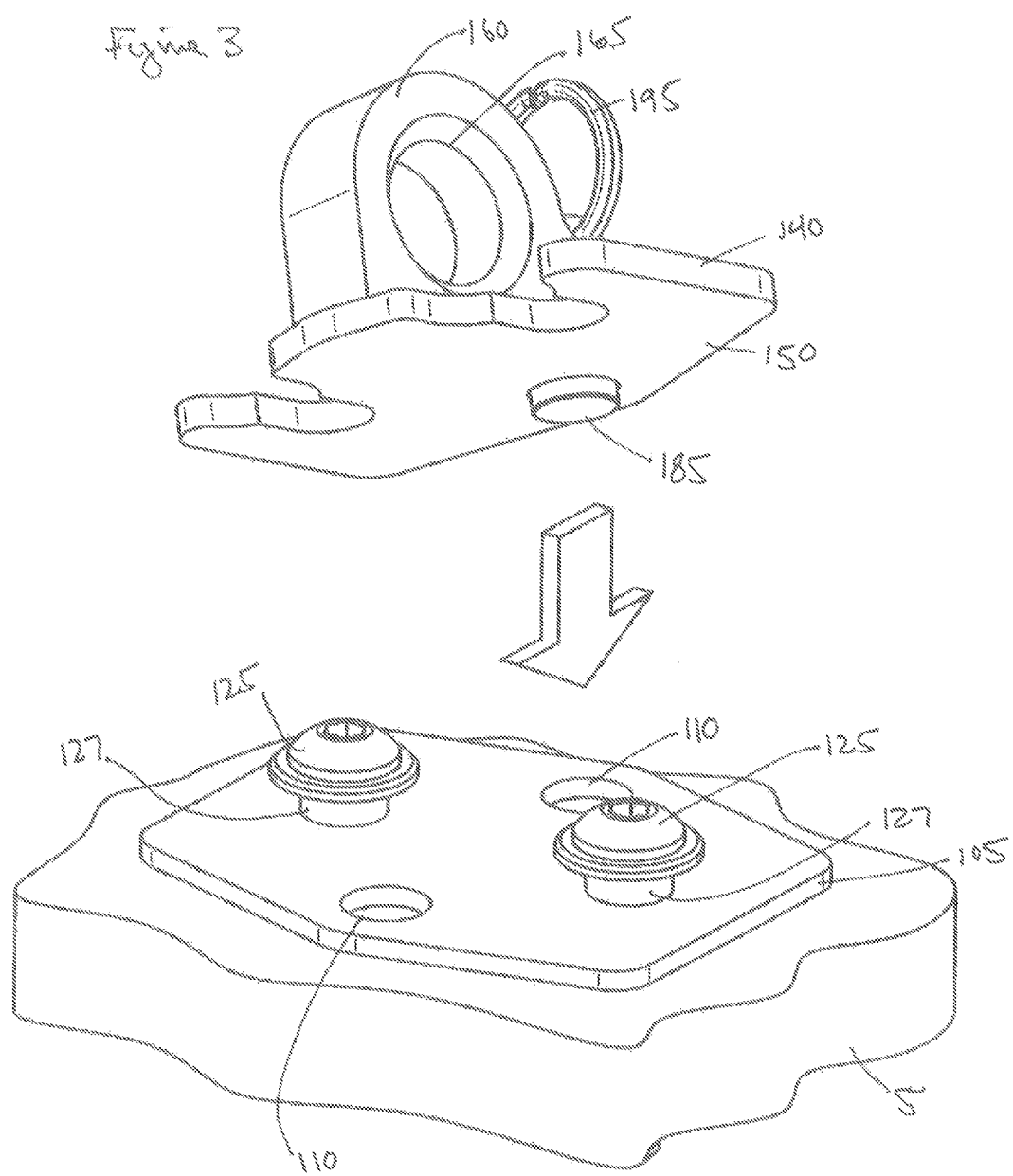
FIG. 3 is a perspective view of the quick release anchor mechanism in accordance with an embodiment of the present invention, being illustrated in a separated configuration.
Figure 4:
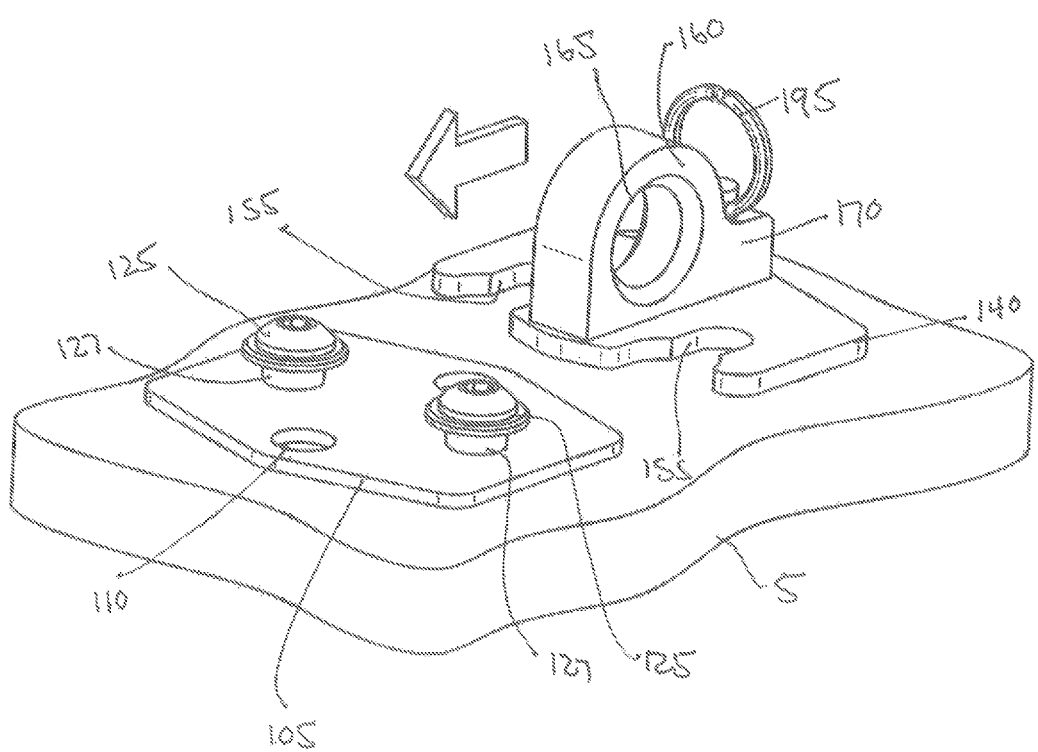
FIG. 4 is a perspective view of the quick release anchor mechanism in accordance with an embodiment of the present invention, being illustrated in a separated configuration.
Figure 5:
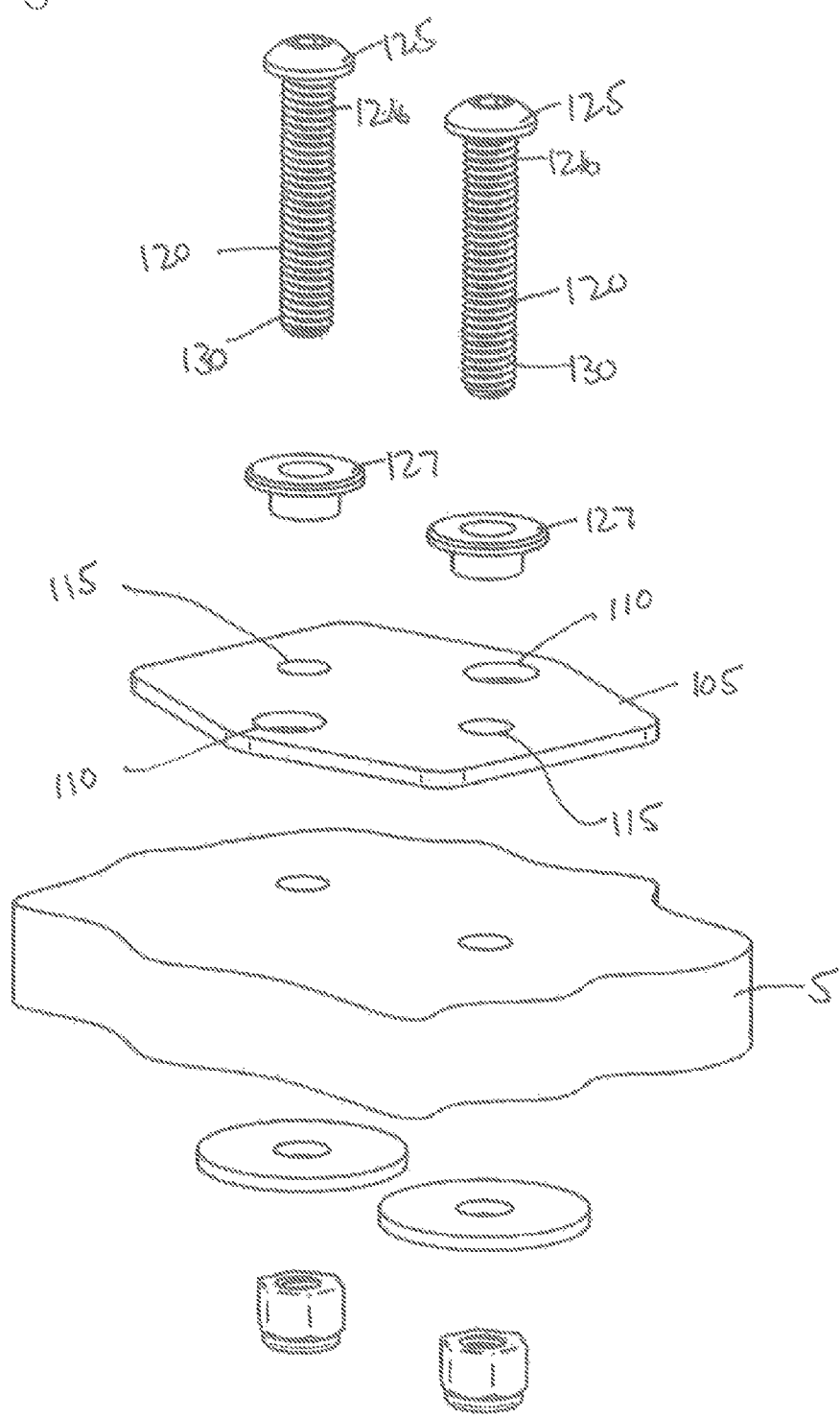
FIG. 5 is a perspective view of the quick release anchor mechanism in accordance with an embodiment of the present invention, being illustrated in an exploded configuration.
Figure 6:
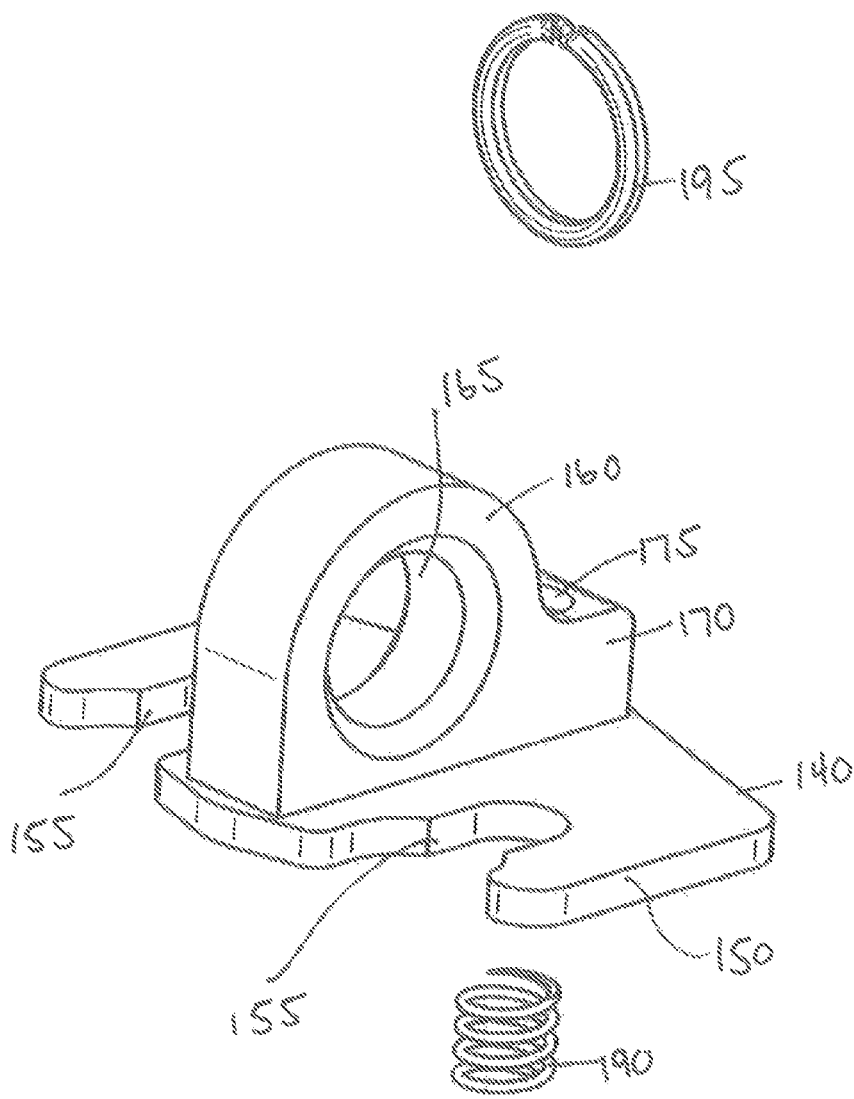
FIG. 6 is a perspective view of the quick release anchor mechanism in accordance with an embodiment of the present invention, being illustrated in an exploded configuration.

Referring now to FIGS. 1 through 9, there is provided a quick release anchor mechanism 100 configured to be attached or secured to a surface 5 and permits a latch 10 to be attached thereto. Once in place the quick release anchor mechanism 100 can be used to tie down cargo in a trailer, truck or any place cargo needs to be restrained. The surface 5 while illustrated on a ground level can also be a wall surface or ceiling surface and be angled.

The quick release anchor mechanism 100 includes a bottom plate 105 secured to the surface 5. The bottom plate 105 include a pair of bolt holes 110 and a pair of pin openings 115. A pair of riser bolts 120 are positioned through the bolt holes and the surface 5 securing the two together. Each riser bolts 120 has a head section 125 expanded form a neck portion 126 that extends from the shaft 130. The neck portion 125 is thicker than the shaft 130 such that the head section 125 is positioned above the bottom plate 105. This may also be accomplished by placing a collar 127 around the shaft 130 such that the neck portion does not slide through the bolt holes 110.

The quick release anchor mechanism 100 further includes a mounting platform 140 that has a base plate 150, which allows the mounting platform to mount and lock into the bottom plate 105. The base plate 150, therefore, is removable from the bottom plate 105 (as described in greater detail below). The base plate 150 includes a pair of keyhole slots 155 that align with the neck portions 125 of the bolts 120. When positioned, the head sections 125 of the bolts are positioned on top of the base plate 150 while the neck portions slide into the keyhole slots 155.

The mounting platform 140 of the quick release anchor mechanism 100 further includes a body 160 extending from the base plate 150. The body 160 includes a mounting loop 165 for receiving the J hook, soft web strapping, rope, chain or shackle used in the tie down of cargo. The body 160 also includes a nape 170 positioned against the mounting loop 165. The nape 170 includes a bore 175 that extends through the nape 170 and through an opening 152 the base plate 150. The bore 175 is sized to receive a spring loaded pin system 180.

The spring loaded pin system 180 is defined to include a pin 182 with a base 185 larger than its pin shaft 187 that extends from the base. A spring 190 is positioned around the pin shaft 187. The spring 190 and the pin 182 are inserted though the opening 152 in the base plate 150 and the pin 182 is pressed through the opening 172 in the nape. The pin 182 further includes a side aperture 192 to receive a ring 195. Once the ring 195 is inserted through the aperture 192 on the pin, the spring loaded pin system 180 is held in place in the nape 170, with the base 185 of the pin 182 extending out of the base plate 150. When the ring 195 is pulled upwardly, the spring is compressed and the base 185 can slide into the bore 175 of the nape, making it flush with the base plate 150.

When the quick release anchor mechanism 100 is in place, the mounting platform 140 is positioned and locked against the bottom plate 105. This is done by having the keyhole slots 155 secured around the riser bolts 120 and the base 185 of the spring loaded pin system 180 inserted into one of the pin openings 115. As such, the base plate 150 can be removed and oriented in two different orientations by rotating the base plate 150 and locking the base 185 of the spring loaded pin system 180 into the other pin opening 115.

Based on the current design, the quick release anchor mechanism can restrain motorcycles, cars, lawnmowers, toolboxes, boxed or palletized cargo. In destructive testing the current design is capable of handling 12,000 pounds.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A quick release anchor mechanism for tying objects to a surface comprising:
    a bottom plate secured to a surface, the bottom plate having a pair of bolt holes positioned at diametrically opposed sides of the bottom plate, and the bottom plate further having at least one pin opening;
    a pair of riser bolts positioned through the pair of bolt holes to secure the bottom plate to the surface, each riser bolt having a head section expanding from a neck portion which extends from a shaft of the riser bolt, the neck portion having a larger neck diameter than a diameter of each bolt hole, such that the neck portion and head section are positioned above the bottom plate by a distance defined by the length of the neck portion;
    a mounting platform defined to include a base plate, a body extending from the base plate, and a nape extending from the body, wherein the base plate includes a pair of keyhole slots grooved into one end of the base plate, the keyhole slots are spaced by a predefined distance to align with the neck portions of the bolts such that when attached the head section of each of the bolts are configured to position on top of the base plate, and wherein the body includes a mounting loop for receiving a means for tying an object to the mounting platform, and wherein the nape includes a bore that extends through the nape and into an opening in the base plate;
    a spring loaded pin system having a pin sized to slide through the bore, the pin has a pin shaft extending from a pin base section, the pin base section has a larger diameter than the pin shaft, the pin shaft includes a side aperture, the spring loaded pin system further includes a ring positioned through the side aperture of the pin shaft and positioned over the bore, the spring loaded pin system further has a spring positioned around the pin shaft within the bore and configured to extend the pin base section out of the opening in the base plate; and
    wherein the mounting platform is locked to the bottom plate by sliding the keyhole slots against the riser bolts and having the pin base section fitted into the at least one pin opening.

2. The quick release anchor mechanism of claim 1, wherein the at least one pin opening is further defined as two pin openings, the pin openings being separately positioned on ends of the bottom plate between the bolt holes, such that the orientation of the mounting platform can be changed by removing the mounting platform from one of the pin openings and setting the mounting platform into the other of the pin openings.

3. The quick release anchor mechanism of claim 1, wherein the neck portion of each riser bolt has a collar slid over the shaft.

4. The quick release anchor mechanism of claim 1, wherein when the ring is pulled away from the nape, the spring is compressed and the pin base slides into the bore of the nape permitting the mounting platform to be removed from the bottom plate.

5. A quick release anchor mechanism for tying objects to a surface comprising:
    a bottom plate secured to a surface, the bottom plate having a pair of bolt holes positioned at diametrically opposed sides of the bottom plate, and the bottom plate further having at least one pin opening;
    a pair of riser bolts positioned through the pair of bolt holes to secure the bottom plate to the surface;
    a mounting platform defined to include a base plate, a body extending from the base plate, and a nape extending from the body, wherein the base plate includes a pair of keyhole slots grooved into one end of the base plate, the keyhole slots are spaced by a predefined distance aligned to secure around the riser bolts, and wherein the body includes a mounting loop for receiving a means for tying an object to the mounting platform, and wherein the nape includes a bore that extends through the nape and into an opening in the base plate; and a spring loaded pin system having a pin sized to slide through the bore, the pin has a pin shaft extending from a pin base section, the pin base section has a larger diameter than the pin shaft, and the pin shaft includes a side aperture, and wherein the spring loaded pin system further includes a ring positioned through the side aperture of the pin shaft and positioned over the bore, the spring loaded pin system further has a spring positioned around the pin shaft within the bore and configured to extend the pin base section out of the opening in the base plate, and wherein the mounting platform is locked to the bottom plate by sliding the keyhole slots against the riser bolts and having the pin base section fitted into the at least one pin opening.

6. The quick release anchor mechanism of claim 5, wherein each riser bolt has a head section expanding from a neck portion that extends from a shaft of each riser bolt, the neck portion having a larger neck diameter than a diameter of the bolt hole, such that the neck portion and head section are positioned above the bottom plate by a distance defined by the length of the neck portion, whereby when the mounting platform is secured to the bottom plate the head section of each of the riser bolts is positioned on top of the base plate.

7. The quick release anchor mechanism of claim 6, wherein the at least one pin opening is further defined as two pin openings, the pin openings being separately positioned on ends of the bottom plate between the bolt holes, such that the orientation of the mounting platform can be changed by removing the mounting platform from one of the pin openings and setting the mounting platform into the other of the pin openings.

8. The quick release anchor mechanism of claim 6, wherein the neck portion of each riser bolt has a collar slid over the shaft.

9. The quick release anchor mechanism of claim 5, wherein when the ring is pulled away from the nape, the spring is compressed and the pin base slides into the bore of the nape permitting the mounting platform to be removed from the bottom plate.

\* \* \* \* \*